(12) United States Patent
Yin et al.

(10) Patent No.: US 11,537,250 B2
(45) Date of Patent: Dec. 27, 2022

(54) TOUCH PANEL AND MANUFACTURING METHOD THEREOF, DISPLAY DEVICE

(71) Applicants: Beijing BOE Technology Development Co., Ltd., Beijing (CN); Hefei Xinsheng Optoelectronics Technology Co., Ltd., Anhui (CN)

(72) Inventors: Qi Yin, Beijing (CN); Qingchao Meng, Beijing (CN); Tongsheng Fan, Beijing (CN); Zongyi Chen, Beijing (CN); Zhongqi Zhang, Beijing (CN)

(73) Assignees: Beijing BOE Technology Development Co., Ltd., Beijing (CN); Hefei Xinsheng Optoelectronics Technology Co., Ltd., Anhui (CN)

( * ) Notice: Subject to any disclaimer, the term of this patent is extended or adjusted under 35 U.S.C. 154(b) by 1162 days.

(21) Appl. No.: 15/780,410

(22) PCT Filed: Oct. 23, 2017

(86) PCT No.: PCT/CN2017/107358
§ 371 (c)(1),
(2) Date: May 31, 2018

(87) PCT Pub. No.: WO2018/126767
PCT Pub. Date: Jul. 12, 2018

(65) Prior Publication Data
US 2021/0165525 A1 Jun. 3, 2021

(30) Foreign Application Priority Data
Jan. 5, 2017 (CN) .......................... 201710008242.9

(51) Int. Cl.
*G06F 3/044* (2006.01)
*G06F 3/041* (2006.01)

(52) U.S. Cl.
CPC .......... *G06F 3/0446* (2019.05); *G06F 3/0412* (2013.01); *G06F 3/0443* (2019.05); *G06F 3/04164* (2019.05); *G06F 2203/04103* (2013.01)

(58) Field of Classification Search
CPC .. G06F 3/0446; G06F 3/0412; G06F 3/04164; G06F 3/0443; G06F 2203/04103; G06F 2203/04111
See application file for complete search history.

(56) References Cited

U.S. PATENT DOCUMENTS

2013/0069887 A1   3/2013 Lee et al.
2013/0106746 A1*  5/2013 Lai ...................... G06F 3/0412
                                                    29/850
(Continued)

FOREIGN PATENT DOCUMENTS

CN   103019423 A   4/2013
CN   203250289 U   10/2013
(Continued)

OTHER PUBLICATIONS

Jan. 22, 2018—(WO) International Search Report and Written Opinion Appn PCT/CN2017/107358 with English Translation.

*Primary Examiner* — Md Saiful A Siddiqui
(74) *Attorney, Agent, or Firm* — Banner & Witcoff, Ltd.

(57) ABSTRACT

A touch panel and a manufacturing method thereof, and a display device are provided. The touch panel includes a base substrate, the base substrate includes a touch area and a lead end area; the touch area is provided with a plurality of first electrodes and a plurality of second electrodes, and the second electrodes are intersected with and insulated from the first electrodes; a plurality of leads, electrically connected with the plurality of first electrodes and the plurality of second electrodes respectively, and connected to the lead
(Continued)

end area (120), and the plurality of leads include a transparent conductive layer lead.

14 Claims, 7 Drawing Sheets

(56) References Cited

U.S. PATENT DOCUMENTS

| | | | |
|---|---|---|---|
| 2014/0182894 A1 | 7/2014 | Liu et al. | |
| 2015/0220202 A1* | 8/2015 | Choung | G06F 3/0446 |
| | | | 216/13 |
| 2016/0209959 A1* | 7/2016 | Lee | G06F 3/04164 |
| 2016/0342234 A1* | 11/2016 | Xu | G06F 3/0445 |
| 2017/0060303 A1* | 3/2017 | Chen | H05K 1/097 |
| 2017/0083138 A1* | 3/2017 | Xu | G06F 3/0412 |

FOREIGN PATENT DOCUMENTS

| | | | |
|---|---|---|---|
| CN | 104731435 | * | 6/2015 |
| CN | 105094444 | * | 11/2015 |
| CN | 105718128 A | | 6/2016 |

* cited by examiner

US 11,537,250 B2

TOUCH PANEL AND MANUFACTURING METHOD THEREOF, DISPLAY DEVICE

The application is a U.S. National Phase Entry of International Application No. PCT/CN2017/107358 filed on Oct. 23, 2017, designating the United States of America and claiming priority to Chinese Patent Application No. 201710008242.9 filed on Jan. 5, 2017. The present application claims priority to and the benefit of the above-identified applications and the above-identified applications are incorporated by reference herein in their entirety.

TECHNICAL FIELD

At least one embodiment of the present disclosure relates to a touch panel, a manufacturing method thereof, and a display device.

BACKGROUND

Currently, touch panel technology generally has the following types: capacitive type, resistive type, optical type, electromagnetic type, ultrasonic type and so on. In general, a capacitive touch panel includes a self-capacitive touch panel and a mutual-capacitive touch panel. The self-capacitive touch panel includes a touch electrode array made of a transparent conductive material on a base substrate, these touch electrodes respectively form the capacitance with the ground. Upon a finger touching the self-capacitive touch panel, the capacitance of the finger will be superimposed on a corresponding touch electrode. A touch detection chip can determine a touch position by detecting the change of a capacitance value of each of the touch electrodes in a touch time period. The mutual-capacitive touch panel includes a horizontal electrode and a vertical electrode which are insulated from each other and made of a transparent conductive material on a base substrate, and a capacitance is formed on a position where the two electrodes intersect with each other. Upon a finger touching the touch panel, a coupling between the two electrodes near a touch point is affected, thereby changing a capacitance value between the two electrodes. A touch detection chip can determine the touch position by detecting the change of the capacitance value in a touch time period.

In general, the touch display device can be divided into two types, such as an on-cell type and an in-cell type, according to a relationship between the touch structure and a display panel. A typical one glass solution (OGS) touch panel belongs to an on-cell type touch panel, and is a technology that directly forming an indium tin oxide (ITO) conductive film and a sensor on a protective glass, wherein one glass simultaneously plays a dual role of protecting the glass and the sensor.

SUMMARY

At least one embodiment of the present disclosure provides a touch panel and a manufacturing method thereof, and a display device. In the touch panel, the longest lead in a plurality of leads adopts a transparent conductive layer lead, which can reduce the influence of particles on the leads, and decrease the probability of the electrical test failure caused by particles without increasing the number of processes, thereby saving costs and improving yield.

At least one embodiment of the present disclosure provides a touch panel, which includes a base substrate, the base substrate includes a touch area and a lead end area; the touch area is provided with a plurality of first electrodes and a plurality of second electrodes, and the second electrodes are intersected and insulated with the first electrodes; a plurality of leads, electrically connected with the plurality of first electrodes and the plurality of second electrodes respectively, and connected to the lead end area, and the plurality of leads include a transparent conductive layer lead.

At least one embodiment of the present disclosure provides a display device, which includes the abovementioned touch panel.

At least one embodiment of the present disclosure provides a manufacturing method a touch panel, which including: forming a touch area and a lead end area on a base substrate; forming a plurality of first electrodes in the touch area; forming a plurality of second electrodes in the touch area, and the plurality of second electrodes are intersected and insulated with the plurality of first electrodes; forming a plurality of leads on an edge of the touch area, the plurality of leads are electrically connected with the plurality of first electrodes and the plurality of second electrodes respectively, and connected to the lead end area, and the plurality of leads include a transparent conductive layer lead.

BRIEF DESCRIPTION OF THE DRAWINGS

In order to clearly illustrate the technical solution of embodiments of the present disclosure, the drawings of the embodiments or related technical description will be briefly described in the following, it is obvious that the drawings in the description are only related to some embodiments of the present disclosure and not limited to the present disclosure.

FIG. 1b is a sectional view of a touch panel along an AA' direction illustrated in FIG. 1a;

FIG. 2b is a sectional view of a touch panel provided by an embodiment of the present disclosure along an AA' direction illustrated in FIG. 2a;

FIG. 2c is a sectional view of a touch panel provided by an embodiment of the present embodiment along a BB' direction illustrated in FIG. 2a;

FIG. 3b is a sectional view of another touch panel provided by an embodiment of the present embodiment along an AA' direction illustrated in FIG. 3a;

REFERENCE SIGNS

10—base substrate; 11—touch area; 12—lead end area; 20—first electrode; 30—second electrode; 40—lead; 60—black matrix; 70—transparent conductive bridge; 80—insulating layer; 100—base substrate; 110—touch area; 120—lead end area; 200—first electrode; 210—first sub-electrode; 300—second electrode; 310—second sub-electrode; 320—connection portion; 400—lead; 410—transparent conductive layer lead; 420—metal lead; 421—first metal lead; 422—second metal lead; 430—first lead; 431—first transparent conductive layer lead; 440—second lead; 441—second transparent conductive layer lead; 500—first insulating layer; 510—lap portion; 600—black matrix; 700—transparent conductive bridge; 800—second insulating layer; 900—lap lead.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. Also, the terms "comprise," "comprising," "include," "including," etc., are intended to specify that the elements or the objects stated before these terms encompass the elements or the objects and equivalents thereof listed after these terms, but do not preclude the other elements or objects. "On," "under," "left," "right" and the like are only used to indicate relative position relationship, and when the position of the object which is described is changed, the relative position relationship may be changed accordingly.

Figure 1A:
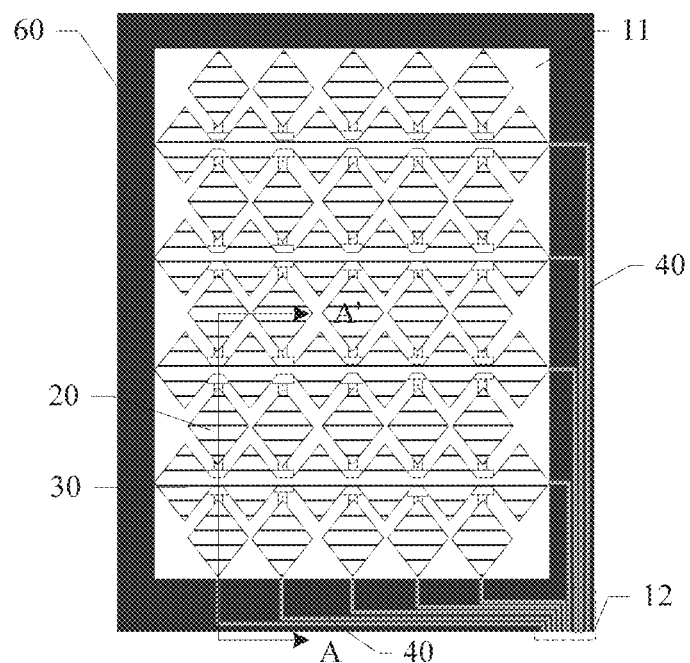
FIG. 1a is a schematic diagram of a touch panel.
Figure 1B:
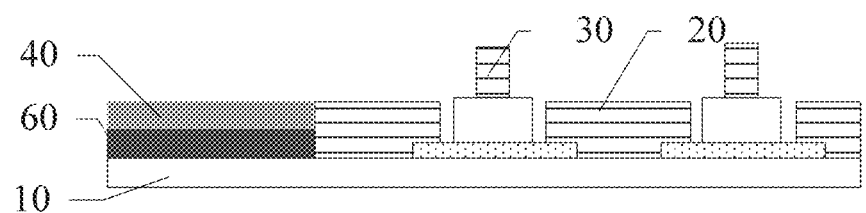

FIG. 1a is a schematic diagram of a touch panel, FIG. 1b is a sectional view of a touch panel along an AA' direction in FIG. 1a. As illustrated in FIG. 1a and FIG. 1b, the touch panel includes a base substrate 10, the base substrate 10 includes a touch area 11, a black matrix 60 surrounding an edge of the touch area 11, and a lead end area 12 disposed on the edge of the touch area 11. The touch area 11 is provided with a plurality of first electrodes 20 and a plurality of second electrodes 30, and the first electrodes 20 are intersected and insulated with the second electrodes 30. The plurality of first electrodes 20 and the plurality of second electrodes 30 are connected to the lead end area 12 through a plurality of leads 40. By applying and detecting an electrical signal to the plurality of leads 40, it can be achieved that a detection on a touch operation or a position where the touch operation occurs. A line width of each of the leads 40 is relatively narrow, for example, the line width is 30 μm. A length of the plurality of leads 40 is determined according to a length of a distance between electrodes electrically connected to the leads 40 and the lead end area 12.

In a study, the inventor(s) of the present application has found that during the deposition or photolithographic processes for manufacturing metal leads, because the line width of the leads is relatively narrow, the leads are easy to be blocked by particles, thereby causing the electrical test failure, for example, an open circuit or a short circuit phenomenon. Furthermore, the longer the length of the leads, the greater the probability of the leads being blocked by the particles, and the greater the probability of generating the electrical test failure.

At least one embodiment of the present disclosure provides a touch panel and a manufacturing method thereof, and a display device. The touch panel includes a base substrate, the base substrate includes a touch area and a lead end area; the touch area is provided with a plurality of first electrodes and a plurality of second electrodes, and the second electrodes are intersected and insulated with the first electrodes; a plurality of leads, electrically connected with the plurality of first electrodes and the plurality of second electrodes respectively, and connected to the lead end area, and the plurality of leads include a transparent conductive layer lead. In the touch panel, the longest lead in the plurality of leads adopts the transparent conductive layer lead, which can reduce the influence of particles on the leads, and decrease the probability of the electrical test failure caused by particles without increasing the number of processes, thereby saving cost and improving yield.

Hereafter, the touch panel, the manufacturing method thereof, and the display device provided by the embodiments of the present disclosure will be described with reference to the accompanying drawings.

Figure 2A:
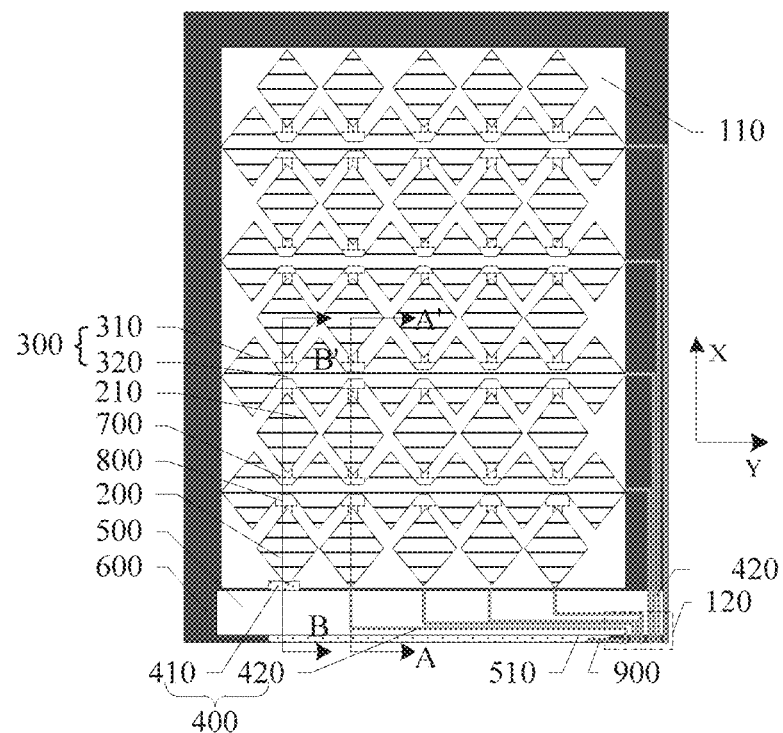
FIG. 2a is a schematic diagram of a touch panel provided by an embodiment of the present disclosure.

An embodiment of the present disclosure provides a touch panel, as illustrated in FIG. 2a, the touch panel includes a base substrate 100, the base substrate 100 includes a touch area 110 and a lead end area 120 disposed in an edge of the touch area 110; the touch area 110 is provided with a plurality of first electrodes 200 and a plurality of second electrodes 300, and the second electrodes 300 are intersected and insulated with the first electrodes 200; a plurality of leads 400, electrically connected with the plurality of first electrodes 200 and the plurality of second electrodes 300 respectively, and connected to the lead end area 120, the plurality of leads 400 include a transparent conductive layer lead 410. A width of the transparent conductive layer lead 410 is wider than that of a general lead, so as to decrease the probability of the transparent conductive layer lead 410 being blocked by particles and generating the electrical test failure, and prevent the occurrence of a short circuit or an open circuit phenomenon, so that the product yield can be improved.

In general, the longer a length of a lead, the greater the probability of the lead being blocked by particles, and greater the probability of generating the electrical test failure. Therefore, in the present embodiment, the transparent conductive layer lead 410 can be utilized to replace a lead electrically connected with the first electrode 200 which is farthest from the lead end area 120, that is, a lead having the longest length, so as to prevent the lead having the longest length from being blocked by particles, prevent the touch panel from encountering a short circuit or an open circuit phenomenon during electrical test or actual use, and the product yield of the touch panel provided by the present embodiment can also be improved. Certainly, the embodiment of the present disclosure includes but is not limited thereto, the transparent conductive layer lead can be further electrically connected with a second electrode which is farthest from the lead end area.

For example, the touch panel provided by an example of the present embodiment, as illustrated in FIG. 2a, the plurality of leads 400 further include a plurality of metal leads 420, that is, the plurality of metal leads 420 are electrically connected with the plurality of first electrodes 200 and the plurality of second electrodes 300 respectively so as to input/output a signal. The touch panel further includes a first insulating layer 500. The first insulating layer 500 is disposed between the plurality of metal leads 420 and the transparent conductive layer lead 410, and configured to insulate the plurality of the metal leads 420 and the transparent conductive layer lead 410 from each other. At this moment, the transparent conductive layer lead 410 and the plurality of metal leads 420 are disposed in different layers. An orthogonal projection of the transparent conductive layer lead 410 on the base substrate 101 can be overlapped with an orthogonal projection of the plurality of metal leads 420 on the base substrate 101. Thus, the width of the transparent conductive layer lead 410 can be wider without increasing the width of the edge of the touch area 110, so as to not only ensure good conduct y, but also greatly decrease the probability of the leads being blocked by the particles and generating the electrical test failure.

For example, the transparent conductive layer lead has a width range of 0.5 cm-1.5 cm. For example, upon a material of the transparent conductive layer lead adopting indium tin oxide (ITO), the sheet resistance Rs of the general indium tin oxide is about 18±4Ω/□, the present embodiment takes a case where the width of the transparent conductive layer lead is 1.5 cm as an example to calculate that the line resistance of the transparent conductive layer lead is approximately 12000 Ω/m; the sheet resistance of a general metal lead is about 0.3±0.05 Ω/□, a line width of the general metal lead is about 30 μm, and then it is calculated that the line resistance of the general metal lead is approximately 10000 Ω/m. Comparing the line resistance of transparent conductive layer lead and the general metal lead, it can be found that the line resistance of the two is not much different. Therefore, a case of replacing the longest metal lead with the transparent conductive layer lead cannot increase the resistance, and has little effect on the line resistance of the touch panel. Furthermore, because a size of the particles is much less than 0.5 cm-1.5 cm, the particles cannot block the transparent conductive layer lead, thereby greatly reducing or even eliminating the probability of the transparent conductive layer lead being blocked, and then the product yield of the touch panel can be improved.

For example, as illustrated in FIG. 2a, the touch panel provided by the present embodiment further includes a black matrix 600, the black matrix 600 is disposed on an edge surrounding the touch panel, the transparent conductive layer lead 410 is disposed on the black matrix 600, and the width of the transparent conductive layer lead 410 is less than or equal to the width of the black matrix 600. Thus, the transparent conductive layer lead will not influence the transmittance of the touch panel.

For example, as illustrated in FIG. 2a, the plurality of first electrodes 200 extend in the X direction, and are arranged in the Y direction perpendicular to the X direction; the plurality of second electrodes 300 extend in the Y direction, and are arranged in the X direction perpendicular to the Y direction, the present embodiment is not limited thereto, for example, the X direction and the Y direction can be exchanged. For example, an angle between the X direction and the Y direction can be other degrees. For example, an arrangement of the plurality of first electrodes 200 and the plurality of second electrodes 300 can be changed according to actual needs. In the present embodiment, the plurality of first electrodes 200 and the plurality of second electrodes 300 can form a capacitor at the overlapping position; upon a finger touching the touch panel, a capacitance coupling near a touch position is affected, thereby changing a capacitance value near the touch position. Thus, the change of the capacitance value can be utilized to determine the touch position. Certainly, the plurality of first electrodes 200 and the plurality of second electrodes 300 can respectively form a capacitor with the ground. The embodiments of the present disclosure are not limited thereto. For example, the plurality of leads 400 electrically connected with the plurality of first electrodes 200 and the plurality of second electrodes 300 are connected to a touch detection chip through the lead end area 120, the touch detection chip inputs/receives a signal through the leads 400, and determines the touch position by analyzing received signals of each touch electrode.

For example, as illustrated in FIG. 2a, the touch panel provided by the present embodiment further includes a transparent conductive bridge 700. For example, each of the first electrodes 200 includes a plurality of first sub-electrodes 210 disposed at intervals. For example, the plurality of first sub-electrodes 210 disposed at intervals are arranged in an array, adjacent ones of the plurality of first sub-electrodes 210 arranged in the X direction are electrically connected with each other through the transparent conductive bridge 700, therefore, a column of the plurality of first sub-electrodes 210 arranged in the X direction constitutes one first electrode 200, the present embodiment is not limited thereto.

For example, as illustrated in FIG. 2a, each of the second electrodes includes a plurality of second sub-electrodes 310 and a connection portion 320 disposed between adjacent ones of the plurality of second sub-electrodes. For example, adjacent ones of the plurality of second sub-electrodes 310 arranged in the Y direction are electrically connected with each other through the connection portion 320, therefore, a row of the plurality of second sub-electrodes 310 arranged in the Y direction and the plurality of connection portion 320 constitute one second electrode 300, the present embodiment is not limited thereto. It should be noted that, the connection portion 320 in the present embodiment is disposed on the transparent conductive bridge 700.

For example, as illustrated in FIG. 2a, the touch panel provided by the present embodiment further includes a second insulating layer 800, the second insulating layer 800 is disposed between the connection portion 320 and the transparent conductive bridge 700, and configured to separate the first electrodes 200 and the second electrodes 300, so as to prevent the first electrodes 200 from being electrically connected with the second electrodes 300. For example, the first insulating layer 500 is disposed in the same layer as the second insulating layer 800. For example, a material of the first insulating layer 500 is the same as that of the second insulating layer 800, that is, the first insulating layer 500 and the second insulating layer 800 are simultaneously formed through a patterning process, therefore, numbers of the processes are not increased, and the coat can be saved.

For example, as illustrated in FIG. 2a, the first insulating layer 500 can further include a tap portion 510 having a width smaller than a width of the transparent conductive layer lead 410 to expose a part of the transparent conductive layer lead 410. For example, the touch panel further includes a lap lead 900, lapped with the transparent conductive layer lead 410 which is exposed, and connected to the lead end area 120.

It should be noted that, as illustrated in FIG. 2a, the lap portion 510 is disposed on the transparent conductive layer lead 410, and an outer edge of the lap portion 510 close to the black matrix 600 exposes a part of the transparent conductive layer lead 410. The lap portion 510 is configured to connect the transparent conductive layer lead 410 to the lead end area 120, so as to prevent transparent conductive layer lead in the lead end area from being electrically connected with other metal leads 420, therefore, a size of the lap portion 510 can be determined according to an arrangement of the metal leads 420. The present embodiment is not limited thereto, for example, only a part of the outer edge of the tap portion 510 of the first insulating layer 500 close to the black matrix 600 has a width less than the width of the transparent conductive layer lead 410, that is, the lap portion 510 can only expose a part needed to be lapped with the lap lead 900.

Figure 2B:
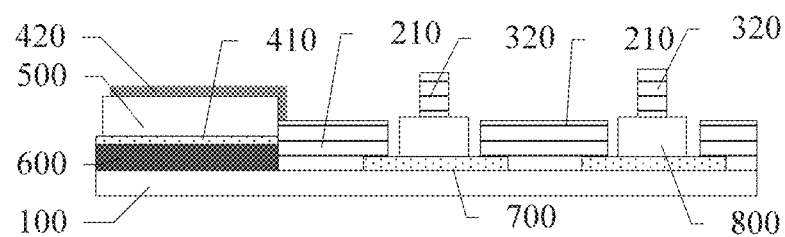

FIG. 2b is a sectional view of the touch panel provided by FIG. 2a along an AA' direction, as illustrated in FIG. 2b, the sectional view of the touch panel along the AA' direction takes a case where the touch panel includes two entire first sub-electrodes 210, two entire connection portions 320 and two entire transparent conductive bridge 700 as an example. The first insulating layer 500 is disposed between the metal leads 420 and the transparent conductive layer leads 410, so as to prevent the metal leads 420 from being electrically connected with the transparent conductive layer lead 410. The transparent conductive layer lead 410 and the metal leads 420 are disposed on different layers, and an orthogonal projection of the metal leads 420 on the base substrate 100 falls within an orthogonal projection of the transparent conductive layer lead 410 on the base substrate 100, so as to reduce the width of the leads arranged on an edge of the touch panel, thereby achieving a narrow frame design. It should be noted that, in FIG. 2b, the two first sub-electrodes 210 and the insulating layer between them can be contacted with each other or disposed at a certain distance from each other.

For example, as illustrated in FIG. 2b, the transparent conductive layer lead 410 and the transparent conductive bridge 700 can be disposed on the same layer.

For example, a material of the transparent conductive layer lead 410 can be the same as a material of the transparent conductive bridge 700, for example, the material of the two can be indium tin oxide and so on, the present embodiment is not limited thereto. That is, the transparent conductive layer lead 410 and the transparent conductive bridge 700 can be simultaneously formed through a patterning process, so as to decrease the probability of the electrical test failure caused by particles without increasing the number of processes, thereby saving cost and improving yield.

Figure 2C:
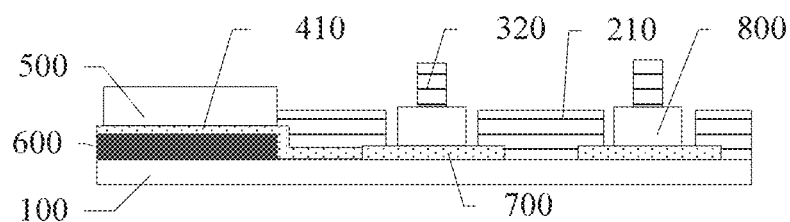

FIG. 2c is a section of the touch panel provided by FIG. 2a along a BB' direction, as illustrated in FIG. 2c, the transparent conductive layer lead 410 can be electrically connected (such as lapped) with a first sub-electrode 210 of the first electrodes 200 farthest from the lead end area 120, so as to provide an electrical signal for the first electrode 200 or input an electrical signal of the first electrode 200. Certainly, the transparent conductive layer lead 410 can be further electrically connected with the transparent conductive bridge 700, the present embodiment is not limited thereto.

Figure 3A:
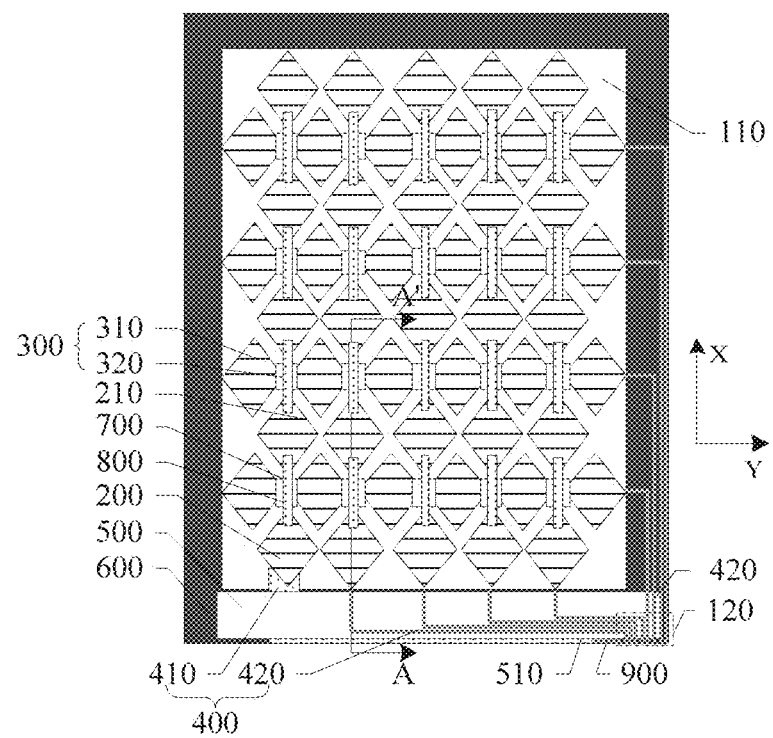
FIG. 3a is a schematic diagram of another touch panel provided by an embodiment of the present disclosure.

Another embodiment of the present disclosure provides a touch panel, which is different from the abovementioned embodiment is that, the transparent conductive bridge 320 is disposed on the connection portion 320 in the present embodiment. FIG. 3a is a schematic diagram of a touch panel provided by the present embodiment, FIG. 3b is a sectional view of a touch panel in FIG. 3a along an AA' direction, as illustrated in FIG. 3a and FIG. 3b, the transparent conductive bridge 700 which is configured to connect the adjacent two first sub-electrodes 210 is disposed on the connection portion 320 of the second electrode 300, and a second insulating layer 800 is disposed between the transparent conductive bridge and the connection portion 320, the second insulating layer 800 is configured to separate the transparent conductive bridge 700 and the connection portion 320, so as to prevent the transparent conductive bridge 700 from being electrically connected with the connection portion 320.

Figure 3B:
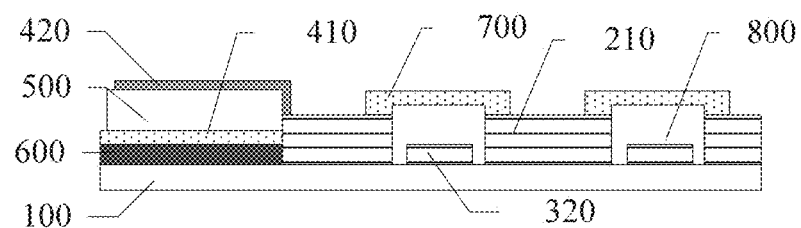

For example, as illustrated to FIG. 3b, the transparent conductive layer lead 410 is disposed in the same layer with the connection portion 320. For example, a material of the transparent conductive layer lead 410 is the same as that of the connection portion 320, for example, the material of the two can be indium tin oxide and so on, the present embodiment is not limited thereto. That is, the transparent conductive layer lead 410 and the connection portion 320 can be simultaneously formed through a patterning process, so as to decrease the probability of the electrical test failure caused by particles without increasing the number of processes, thereby saving cost and improving yield.

Figure 4:
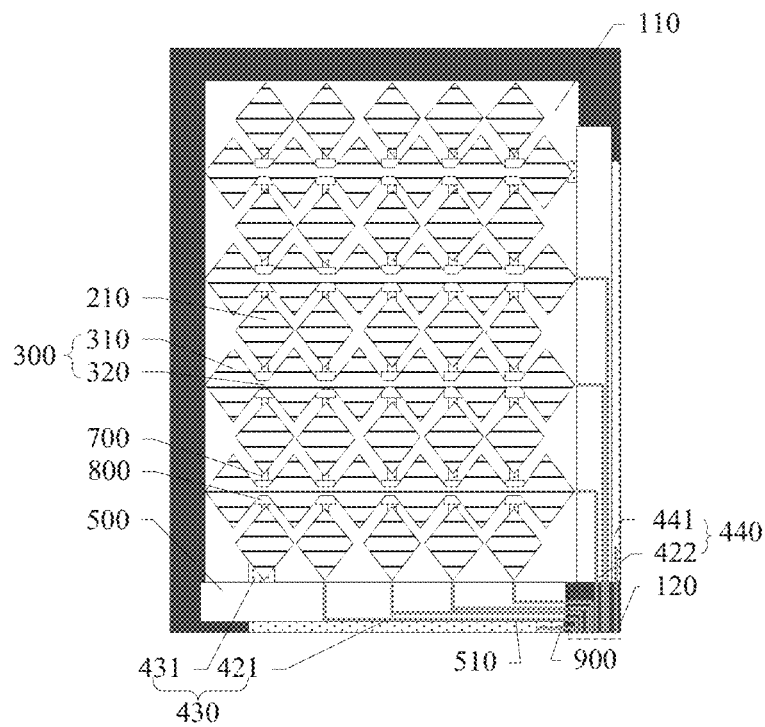
FIG. 4 is a schematic diagram of another touch panel provided by an embodiment of the present disclosure.

FIG. 4 is a schematic diagram of a touch panel provided by an embodiment of the present disclosure, as illustrated in FIG. 4, the plurality of leads include a plurality of first leads 430, electrically connected with the plurality of first electrodes 210 respectively and connected to the lead end area 120; and a plurality of second leads 440, electrically connected with the plurality of second electrodes 310 and connected to the lead end area 120. The plurality of first leads 430 include a first transparent conductive layer lead 431, electrically connected with a first electrode 210 farthest from the lead end area 120; the plurality of second leads 440 include a second transparent conductive layer lead. 441, electrically connected with a second electrode 310 farthest from the lead end area 120. Thus, the leads electrically connected with the first electrode 210 and the second electrode 310 farthest from the lead end area 120, that is, the longest first lead and the longest second lead, are transparent conductive layer leads, so as to prevent the first lead having the longest length and the second lead having the longest length from being blocked by particles. And prevent the touch panel from encountering a short circuit or an open circuit phenomenon during electrical test or actual use, and then the product yield of the touch panel provided by the present embodiment can also be improved.

For example, the plurality of first leads 430 further include a plurality of first metal leads 421; the plurality of second leads 440 further include a plurality of second metal leads 422.

For example, the plurality of first leads 430 and the plurality of second leads 440 are connected to a touch detection chip, the touch detection chip inputs/receives a signal through the leads, and determines the touch position by analyzing received signals of each touch electrode.

The longest leads of the plurality of first leads 430 and the plurality of second leads 440 in the touch panel provided by the present embodiment adopt the first transparent conductive layer lead 431 and the second transparent conductive layer lead 441, which can reduce the influence of particles on the leads; on the other hand, the first transparent conductive layer lead 431 and the second transparent conductive layer lead 441 can be disposed in the same layer with the transparent conductive bridge 700, for example, they can be simultaneously formed through a patterning process, so as to decrease the probability of the electrical test failure caused by particles without increasing the number of processes, thereby saving cost and improving yield. In addition, the first transparent conductive layer lead 431 and the plurality of first metal leads 421 are disposed on different layers, and an orthogonal projection of the first metal leads 421 on the base substrate 100 falls within an orthogonal projection of the first transparent conductive layer lead 431 on the base substrate 100; the second transparent conductive layer lead 441 and the plurality of second metal leads 422 are disposed in different layers, and an orthogonal projection of the second metal leads 422 on the base substrate 100 falls within an orthogonal projection of the second transparent conductive layer lead 441 on the base substrate 100, so as to reduce the width of the leads arranged on an edge of the touch panel, thereby achieving a narrow frame design.

Figure 5:
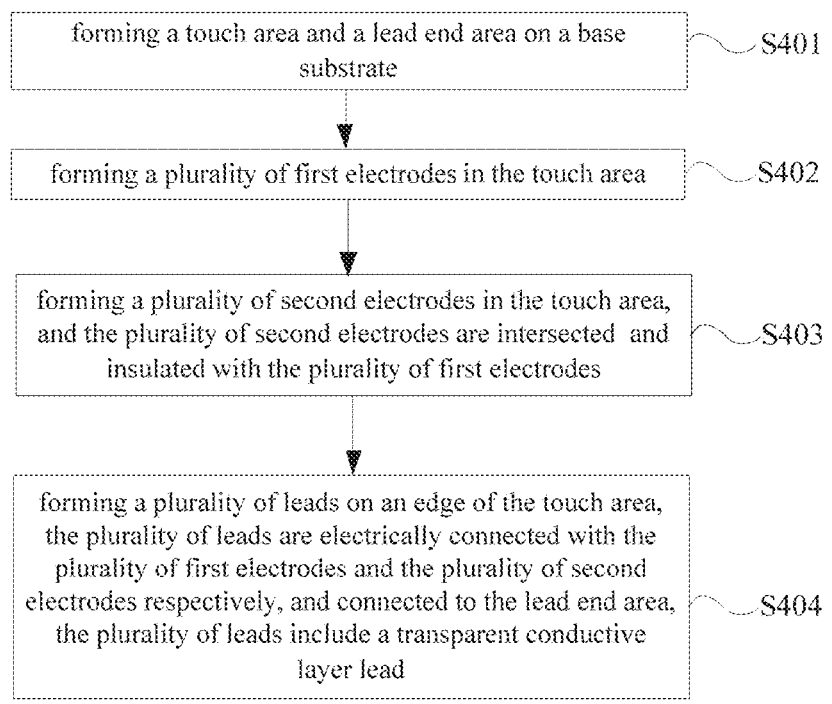
FIG. 5 is a schematic diagram of a manufacturing method of a touch panel provided by an embodiment of the present disclosure.

An embodiment of the present disclosure provides a manufacturing method of a touch panel, flow diagram and the specific steps are illustrated in FIG. 5, and the manufacturing method includes the following steps S401-S404.

S401: forming a touch area and a lead end area on a base substrate.

For example, the base substrate can be made of one or more materials, such as glass, polyimide, polycarbonate, polyacrylates, polyetherimide, polyethersulfone, polyethylene terephthalate, and polyethylene naphthalate.

S402: forming a plurality of first electrodes in the touch area.

S403: forming a plurality of second electrodes in the touch area, and the plurality of second electrodes are intersected and insulated with the plurality of first electrodes.

S404: forming a plurality of leads on an edge of the touch area, the plurality of leads are electrically connected with the plurality of first electrodes and the plurality of second electrodes respectively, and connected to the lead end area, the plurality leads include a transparent conductive layer lead.

In the manufacturing method of the touch panel provided by the present embodiment, a width of the transparent conductive layer lead is wider than that of a general lead, so as to decrease the probability of the transparent conductive layer lead being blocked by the particles and the electrical test failure, and prevent the occurrence of a short circuit or an open circuit phenomenon, so that the product yield can be improved.

In general, the longer the length of the leads, the greater the probability of that the leads being blocked by the particles, and the greater the probability of generating the electrical test failure. Therefore, the present embodiment can make a lead electrically connected with the first electrode and/or the second electrode farthest from the lead end area, that is, a lead having the longest length, as the transparent conductive layer lead, so as to prevent the lead having the longest length from being blocked by particles, and prevent the touch panel from encountering a short circuit or an open circuit phenomenon during electrical test or actual use, and the product yield of the touch panel provided by the present embodiment can also be improved. Certainly, the embodiment of the present disclosure includes but is not limited thereto, the transparent conductive layer lead can further electrically connected with the second electrode farthest from the lead end area.

For example, in the manufacturing method of the touch panel provided by an example of the present embodiment, the plurality of leads further include metal leads, the manufacturing method further includes: forming a first insulating layer between the metal leads and the transparent conductive layer lead. Thus, the first insulating layer can insulate the metal leads and the transparent conductive layer lead from each other. And because the transparent conductive layer lead and the plurality of metal leads are disposed on different layers, an orthogonal projection of the transparent conductive layer lead on the base substrate can be overlapped with an orthogonal projection of the plurality of metal leads on the base substrate. Thus, the width of the transparent conductive layer lead can be set wider without increasing the width of the edge of the touch area, so as to not only ensure good conductivity, but also greatly decrease the probability of the leads being blocked by the particles and generating the electrical test failure.

For example, in the manufacturing method of the touch panel provided by an example of the present embodiment, each of the plurality of first electrodes includes a plurality of first sub-electrodes disposed at intervals, each of the plurality of second electrodes includes a plurality of second sub-electrodes and a connection portion disposed between two adjacent ones of the plurality of second sub-electrodes, the manufacturing method further includes: forming a transparent conductive bridge between two adjacent ones of the plurality of first sub-electrodes to electrically connect the two adjacent ones of the plurality of first sub-electrodes; the transparent conductive layer lead is formed simultaneously with the transparent conductive bridge or the connection portion through a patterning process. Thus, the manufacturing method of the touch panel does not increase a new preparation process compared with a general process; and a width of the transparent conductive layer lead is wider than that of a general lead, so as to decrease the probability of the electrical test failure caused by particles without increasing the number of processes, and prevent the occurrence of a short circuit or an open circuit phenomenon, thereby saving cost and improving the product yield.

For example, the manufacturing method of the touch panel provided by an example of the present embodiment further includes: forming a second insulating layer between the connection portion and the transparent conductive bridge, the first insulating layer and the second insulating layer are simultaneously formed through a patterning process. Thus, the manufacturing method of the touch panel does not increase a new preparation process compared with a general process, so as to save the cost.

Figure 6A:
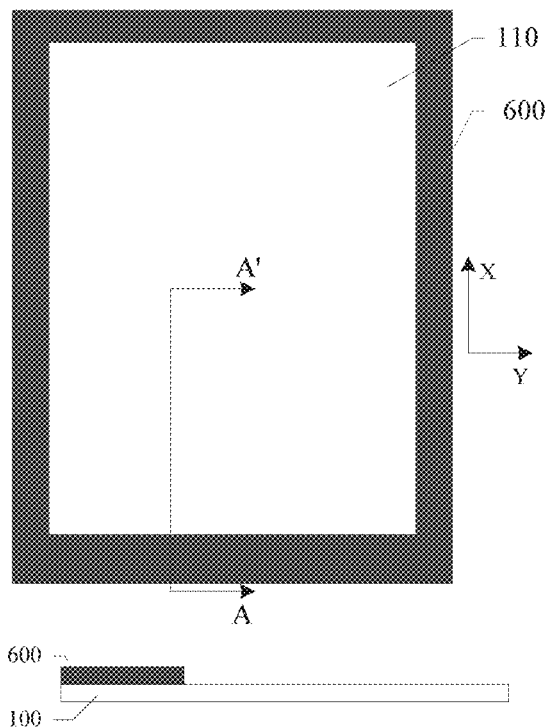
FIGS. 6a to 6e are flow diagrams of a manufacturing method of a touch panel provided, by an embodiment of the present disclosure.

FIG. 6a to 6e are flow diagrams of a manufacturing method of a touch panel provided by an example of the present embodiment. As illustrated in FIG. 6a to FIG. 6e, the manufacturing method includes the following steps:

As illustrated in FIG. 6a, a black matrix 600 is formed on the base substrate 100, the black matrix 600 is formed on an edge of the touch panel, and the area surrounded by the black matrix 600 is the touch area 110.

For example, a base material of the black matrix 600 can be chromium and so on, and can also be acrylic resin mixed with black pigment (mainly carbon), for example, a black resin containing carbon, titanium, nickel and other raw materials can be incorporated in the photoresist. It should be noted that, a second view of FIG. 6a is a section view of a first view along an AA' direction, and then second views of FIG. 6b to FIG. 6e are section views of first views along the AA' direction.

Figure 6B:
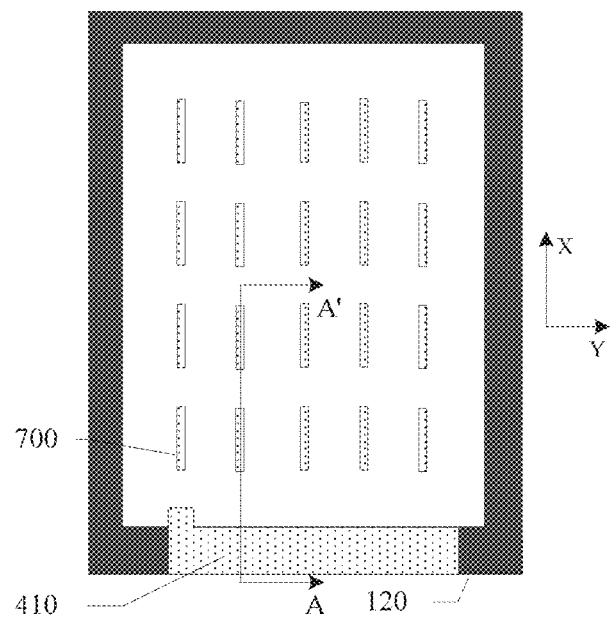

As illustrated in FIG. 6b, the transparent conductive layer lead 410 is formed on the black matrix 600, a width of the transparent conductive layer lead 410 can be less than or equal to the width of the black matrix 600. For example, the transparent conductive layer lead 410 has a width range of 0.5 cm-1.5 cm, the present embodiment is not limited thereto. For example, a plurality of transparent conductive bridges 700 arranged in an array are formed in the touch area 110, the transparent conductive bridges 700 are formed in the same layer as the transparent conductive layer lead 410, that is, the transparent conductive bridges 700 and the transparent conductive layer lead 410 can be simultaneously formed through a patterning process, therefore, the manufacturing method does not increase a new preparation process compared with a general process. A width of the transparent conductive layer lead 410 is wider than that of a general lead, so as to decrease the probability of the probability of the electrical test failure caused by particles without increasing the number of processes, and prevent the occurrence of a short circuit or an open circuit phenomenon, so that the cost can be saved, and the product yield can be improved. The present embodiment is not limited thereto, a connection portion can also be formed in the touch area 110, the transparent conductive bridges 700 are formed on the same layer as the connection portion, that is, the transparent conductive bridges 700 are formed simultaneously with the connection portion through a patterning process.

As illustrated in FIG. 6b, the lead end area 120 is formed on an edge of the touch area 110 of the touch panel, a plurality of leads formed subsequently will be connected to the lead end area 120.

Figure 6C:
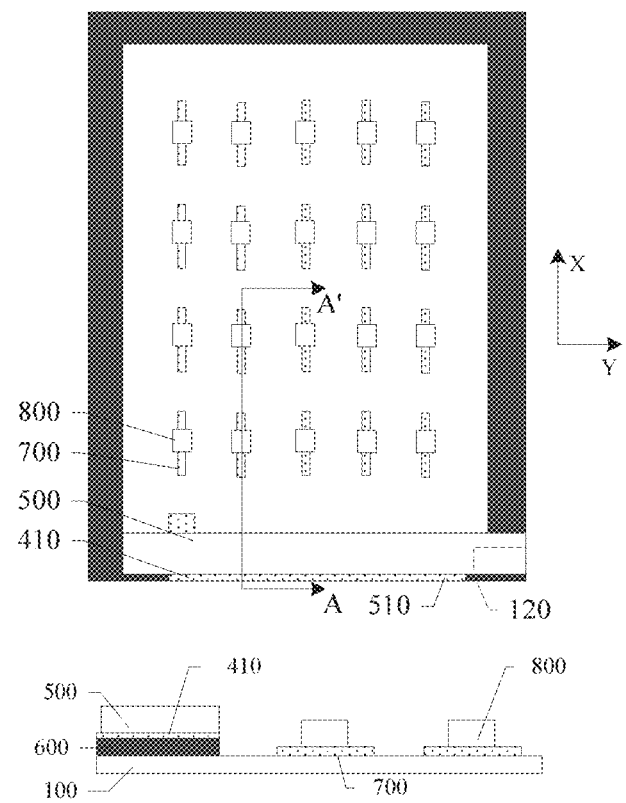

As illustrated in FIG. 6c, the first insulating layer 500 is formed on the transparent conductive layer lead 410, the first insulating layer 500 includes a lap portion 510 having a width smaller than a width of the transparent conductive layer lead 410 to expose a part of the transparent conductive layer lead 410. The lap portion 510 is configured to prevent the metal leads formed subsequently from being electrically connected with the transparent conductive layer lead 410, therefore, a size of the tap portion 510 is according to an arrangement of the metal leads formed subsequently. For example, the width of the lap portion 510 can be 100 μm narrower than the width of the transparent conductive layer lead 410. The present embodiment is not limited thereto, for example, a width of only a part of the outer edge of the tap portion 510 of the first insulating layer 500 close to the black matrix 600 is less than the width of the transparent conductive layer lead 410, or, the width of the lap portion 510 is the same as the width of the transparent conductive layer lead 410.

As illustrated in FIG. 6c, a second insulating layer 800 is formed on each of the plurality of transparent conductive bridge 700. For example, the second insulating layer 800 is formed simultaneously with the first insulating layer 800 through a patterning process, thus, the manufacturing method does not increase a new preparation process compared with a general process, thereby saving the cost.

Figure 6D:
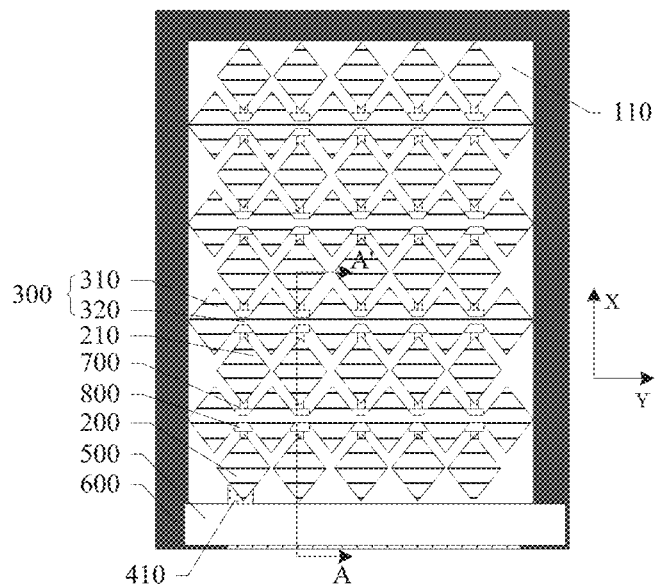

As illustrated in FIG. 6d, the plurality of first electrodes 200 and the plurality of second electrodes 300 are formed in the touch area 100, and the second electrodes 300 are intersected and insulated with the first electrodes 300.

As illustrated in FIG. 6d, the plurality of first electrodes 200 extend in the X direction, and are arranged in the Y direction perpendicular to the X direction; the plurality of second electrodes 300 extend in the Y direction, and are arranged in the X direction perpendicular to the Y direction, the present embodiment is not limited thereto.

For example, each of the first electrodes 200 includes a plurality of first sub-electrodes 210 disposed at interval. For example, the plurality of first sub-electrodes 210 disposed at interval are arranged in an array, adjacent ones of the plurality of first sub-electrodes 210 arranged in the X direction are electrically connected with each other through the transparent conductive bridge 700, therefore, a column of the plurality of first sub-electrodes 210 arranged in the X direction constitutes one first electrode 200, the present embodiment is not limited thereto.

For example, each of the second electrodes includes a plurality of second sub-electrodes 310 and a connection portion 320 disposed between adjacent ones of the plurality of second sub-electrodes. For example, adjacent ones of the plurality of second sub-electrodes 310 arranged in the Y direction are electrically connected with each other through the connection portion 320, therefore, a row of the plurality of second sub-electrodes 310 arranged in the Y direction and the plurality of connection portion 320 constitute one second electrode 300, the present embodiment is not limited thereto.

For example, the plurality of first electrodes 200 and the plurality of second electrodes 300 can be transparent conductive layers. For example, a selected material of the two includes transparent conductive oxide, for example, the transparent conductive oxide can include a combination or at least one selected from the group consisting of indium tin oxide (ITO), indium zinc oxide (IZO), zinc oxide (ZnO) indium oxide ($In_2O_3$), indium gallium oxide (IGO), and aluminum zinc oxide (AZO), the embodiment of the present disclosure is not limited thereto. Certainly, the plurality of first electrodes 200 and the plurality of second electrodes can also be thin transparent metal layers, for example, a thickness of the transparent metal layers has a range of 10 nm-20 nm.

As illustrated in FIG. 6d, the transparent conductive layer lead 410 is electrically connected with a first electrode 200 farthest from the lead end area 120, the present embodiment is not limited thereto, the transparent conductive layer lead 410 can further be electrically connected with a second electrode 300 farthest from the lead end area 120. In the touch panel, the longest lead among a plurality of leads adopts the transparent conductive layer lead 410, which can reduce the influence of particles on the leads, and decrease the probability of the electrical test failure caused by particles without increasing the number of processes, thereby saving the cost and improving the yield.

Figure 6E:
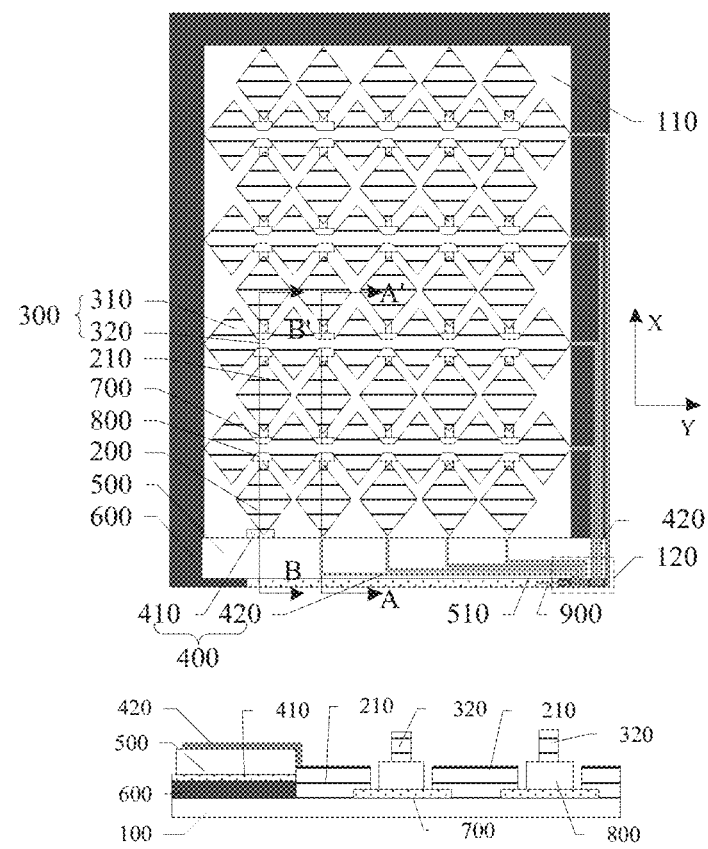

As illustrated in FIG. 6e, the plurality of metal leads 420 are formed on the first insulating layer 500, the plurality of metal leads 420 are electrically connected with the plurality of first electrodes 200 respectively, and connected to the lead end area 120. It should be noted that, the touch panel further includes a lap lead 900, lapped with the transparent conductive layer lead 410 which is exposed, and connected to the lead end area 120. For example, the lap lead 900 can further be formed simultaneously with the transparent conductive layer lead 410, that is, the lap lead 900 is formed before forming the first insulating layer 500, therefore, the first insulating layer 500 formed subsequently can completely cover the transparent conductive layer 410, the present embodiment is not limited thereto.

For example, in the manufacturing method of the touch panel provided by an example of the present embodiment, after forming the plurality of leads, the method further includes forming a protective layer (which is not illustrated in figures) on the touch panel. For example, a material of the protective layer can be photoresist and so on, the present embodiment is not limited thereto.

It should be noted that, the abovementioned preparation steps are only schematic steps, the present embodiment is not limited thereto, the steps can further include a step of forming two transparent conductive layer leads, and the corresponding steps will also be slightly different, which is not repeated herein.

An embodiment of the present disclosure provides a display device. The display device includes the touch panel in any of the abovementioned embodiments. The longest lead among the plurality of leads in the touch panel of the display device adopts the transparent conductive layer lead, which can reduce the influence of particles on the leads, and decrease the probability of the electrical test failure caused by particles without increasing the number of processes, thereby saving cost and improving yield. In addition, the transparent conductive layer lead and the plurality of metal leads are disposed on different layers, and an orthogonal projection of the metal leads on the base substrate falls within an orthogonal projection of the transparent conductive layer lead on the base substrate, so as to reduce the width of the leads arranged on an edge of the touch panel, thereby achieving a narrow frame, design.

For example, the display panel includes a liquid crystal display panel or a light emitting diode display device.

For example, the display device can be a display device such as a liquid display device, an electronic paper, a light emitting diode display device, etc., and any product or component having a display function such as a television, a digital camera, a mobile phone, a watch, a tablet computer, a notebook computer, a navigator, or the like including these display devices.

The following points should to be explained:

(1) Unless otherwise defined, in the embodiments and accompanying drawings in the present disclosure, the same reference numeral represents the same meaning.

(2) The accompanying drawings involve only the structure(s) in connection with the embodiment(s) of the present disclosure, and other structure(s) can be referred to common design(s).

(3) For the purpose of clarity, in accompanying drawings for illustrating the embodiment(s) of the present disclosure, layer(s) or area(s) may be enlarged. However, it should understood that, the case in which a component or element such as a layer, film, area, substrate or the like is referred to be "on" or "under" another component or element, it may be directly on or under the another component or element or a component or element is interposed therebetween.

The foregoing is only the embodiments of the present invention and not intended to limit the scope of protection of the present invention, alternations or replacements which can be easily envisaged by any skilled person being familiar with the present technical field shall fall into the protection scope of the present disclosure. Thus, the protection scope of the present disclosure should be based on the protection scope of the claims.

What is claimed is:

1. A touch panel, comprising:
    a base substrate, comprising a touch area and a lead end area;
    a plurality of first electrodes, disposed in the touch area;
    a plurality of second electrodes, intersected with the plurality of the first electrodes, disposed in the touch area, and insulated from the plurality of first electrodes;
    a plurality of leads, electrically connected with the plurality of first electrodes and the plurality of second electrodes respectively, and connected to the lead end area, wherein the plurality of leads comprise a transparent conductive layer lead and a metal lead;
    a first insulating layer, disposed between the metal lead and the transparent conductive layer lead, the first insulating later comprises a lap portion having a width smaller than a width of the transparent conductive layer lead to expose a part of the transparent conductive layer lead, and
    a lap lead, lapped with the transparent conductive layer lead which is exposed, and connected to the lead end area.

2. The touch panel according to claim 1, wherein the transparent conductive layer lead is electrically connected with a first electrode farthest from the lead end area among the plurality of first electrodes and/or a second electrode farthest from the lead end area among the plurality of second electrodes.

3. The touch panel according to claim 2, further comprising:
    a black matrix, disposed on an edge surrounding the touch panel, the transparent conductive layer lead is disposed on the black matrix, a width of the transparent conductive layer lead is less than or equal to a width of the black matrix.

4. The touch panel according to claim 2, wherein the plurality of leads comprise: a plurality of first leads, electrically connected with the plurality of first electrodes respectively and connected to the lead end area; and a plurality of second leads, electrically connected with the plurality of second electrodes and connected to the lead end area, the plurality of first leads comprise a first transparent conductive layer lead, electrically connected with a first electrode farthest from the lead end area among the plurality of first electrodes, the plurality of second leads comprise a second transparent conductive layer lead, electrically connected with a second electrode farthest from the lead end area among the plurality of second electrodes.

5. The touch panel according to claim 1, wherein the transparent conductive layer lead has a width range of 0.5 cm-1.5 cm.

6. The touch panel according to claim 1, further comprising:
    a black matrix, disposed on an edge surrounding the touch panel, the transparent conductive layer lead is disposed on the black matrix, a width of the transparent conductive layer lead is less than or equal to a width of the black matrix.

7. The touch panel according to claim 1, wherein the plurality of leads comprise: a plurality of first leads, electrically connected with the plurality of first electrodes respectively and connected to the lead end area; and a plurality of second leads, electrically connected with the plurality of second electrodes and connected to the lead end area, the plurality of first leads comprise a first transparent conductive layer lead, electrically connected with a first electrode farthest from the lead end area among the plurality of first electrodes, the plurality of second leads comprise a second transparent conductive layer lead, electrically connected with a second electrode farthest from the lead end area among the plurality of second electrodes.

8. The touch panel according to claim 1, wherein each of the plurality of first electrodes comprises a plurality of first sub-electrodes disposed at intervals, each of the plurality of second electrodes comprises a plurality of second sub-electrodes and a connection portion disposed between adjacent ones of the plurality of second sub-electrodes, the touch panel further comprises:
    a transparent conductive bridge,
    wherein two adjacent ones of the plurality of first sub-electrodes in each of the plurality of first electrodes are electrically connected with each other through the transparent conductive bridge, the transparent conductive layer lead is disposed in a same layer as the transparent conductive bridge or the connection portion.

9. The touch panel according to claim 8, further comprising:
    a second insulating layer, disposed between the connection portion and the transparent conductive bridge, wherein the first insulating layer is disposed in a same layer as the second insulating layer.

10. A display device, comprising the touch panel according to claim 1.

11. A manufacturing method of a touch panel, comprising:
forming a touch area and a lead end area on a base substrate;
forming a plurality of first electrodes in the touch area;
forming a plurality of second electrodes in the touch area, wherein the plurality of second electrodes are intersected with and insulated from the plurality of first electrodes;
forming a plurality of leads on an edge of the touch area, wherein the plurality of leads are electrically connected with the plurality of first electrodes and the plurality of second electrodes respectively, and connected to the lead end area, wherein the plurality of leads comprise a transparent conductive layer lead and a metal lead;
forming a lap lead, lapped with the transparent conductive layer lead which is exposed, and connected to the lead end area; and
forming a first insulating layer between the metal lead and the transparent conductive layer lead, wherein the first insulating layer comprises a lap portion having a width smaller than a width of the transparent conductive layer lead to expose a part of the transparent conductive layer lead.

12. The manufacturing method of the touch panel according to claim 11, wherein the transparent conductive layer lead is electrically connected with a first electrode farthest from the lead end area among the plurality of first electrodes and/or a second electrode farthest from the lead end area among the plurality of second electrodes.

13. The manufacturing method of the touch panel according to claim 11, wherein each of the plurality of first electrodes comprises a plurality of first sub-electrodes disposed at interval, each of the plurality of second electrodes comprises a plurality of second sub-electrodes and a connection portion disposed between two adjacent ones of the plurality of second sub-electrodes, the manufacturing method further comprises:
forming a transparent conductive bridge between two adjacent ones of the plurality of first sub-electrodes to electrically connect the two adjacent ones of the plurality of first sub-electrodes,
wherein the transparent conductive layer lead and the transparent conductive bridge or the connection portion are simultaneously formed through a patterning process.

14. The manufacturing method of the touch panel according to claim 13, further comprising:
forming a second insulating layer between the connection portion and the transparent conductive bridge,
wherein the first insulating layer and the second insulating layer are simultaneously formed through a second patterning process.

* * * * *